US008638675B2

(12) United States Patent
Wang et al.

(10) Patent No.: US 8,638,675 B2
(45) Date of Patent: Jan. 28, 2014

(54) METHOD AND DEVICE FOR DATA RELAY TRANSMISSION IN WIRELESS RELAY NETWORK

(75) Inventors: Dongyao Wang, Shanghai (CN); Wei Zou, Shanghai (CN); Shan Jin, Shanghai (CN)

(73) Assignee: Alcatel Lucent, Paris (FR)

( * ) Notice: Subject to any disclaimer, the term of this patent is extended or adjusted under 35 U.S.C. 154(b) by 493 days.

(21) Appl. No.: 12/863,256

(22) PCT Filed: Jan. 17, 2008

(86) PCT No.: PCT/CN2008/000122
§ 371 (c)(1),
(2), (4) Date: Jul. 16, 2010

(87) PCT Pub. No.: WO2009/089655
PCT Pub. Date: Jul. 23, 2009

(65) Prior Publication Data
US 2010/0309792 A1 Dec. 9, 2010

(51) Int. Cl.
*H04J 1/16* (2006.01)
*H04B 3/36* (2006.01)

(52) U.S. Cl.
USPC .............................................. 370/246; 455/7

(58) Field of Classification Search
USPC ............................... 370/243–247; 455/7–11.1
See application file for complete search history.

(56) References Cited

U.S. PATENT DOCUMENTS

2005/0232183 A1 10/2005 Sartori et al.
2007/0082621 A1 4/2007 Lee et al.

FOREIGN PATENT DOCUMENTS

| CN | 1988411 A | 6/2007 |
|---|---|---|
| CN | 101006660 A | 7/2007 |
| WO | WO 2007/019672 A1 | 1/2007 |
| WO | WO2007019672 * | 2/2007 |
| WO | WO2007019672 A1 | 2/2007 |
| WO | WO 2008/004059 A2 | 1/2008 |
| WO | WO2008004059 A2 | 1/2008 |

OTHER PUBLICATIONS

European Search Report for EP 08 70 0671 dated Aug. 17, 2011.
International Search Report for PCT/CN2008/000122.

* cited by examiner

*Primary Examiner* — Afshawn Towfighi
(74) *Attorney, Agent, or Firm* — Fay Sharpe LLP

(57) ABSTRACT

A method and a device for data relay transmission in a wireless relay communication network are provided, in which, the relay station directly obtains corresponding egress CID related information based on input MAC PDUs, then generates output MAC PDUs including the egress CID related information, and at last, according to the egress CID related information, performs QoS scheduling for the output MAC PDUs, so as to output them in an sequence of QoS. The invention omits the steps of de-cascading, de-segmenting or de-capsulating the MAC PDUs in order to obtain MAC SDUs, and the steps of scheduling by category, cascading, segmenting, and encapsulating the MAC SDUs in order to re-generate the MAC PDUs in the prior art, and the invention simplifies the data processing procedure and achieves the goal of decreasing the relay latency.

22 Claims, 14 Drawing Sheets

SS 1              RS 2              BS 3

METHOD AND DEVICE FOR DATA RELAY TRANSMISSION IN WIRELESS RELAY NETWORK

TECHNICAL FIELDS

The invention relates to wireless relay communication, particularly relates to the relay station in wireless relay communication network.

BACKGROUND OF THE INVENTION

The WiMAX technology, based on the IEEE 802.16 standard, supports both fixed (802.16d) and mobile (802.16e) broad band wireless access. It provides new solution to solve the "last mile" of broad band data access, and it is expected to be a very promising technical solution in the next generation wireless broad band access network. As to the communication network, the latency a always considered as one of the most key factors to the performance of the network, and it is also applicable for the WiMAX systems which provide mechanisms for QoS guarantee. The IEEE 802.16 standard defines 5 different types for scheduled service, in order to provide differentiated QoS services, and these types for scheduled service comprise: unsolicited grant service (UGS), real-time polling service (rtPS), extended real-time polling service (ertPS), non-real-time polling service (nrtPS) and best effort (BE) service. These different types for services have different requirements for latency. For example, the unsolicited grant service (UGS), real-time polling service (rtPS) and extended real-time polling service (ertPS) have strict requirements for latency. Thus, the controlling of latency, as well as the decreasing of latency as possible, are very important issues, and are the pursuit for those skilled in the art all the time. The construction of multi-hop relay network is a recent developing di reaction of the IEEE 802.16 standard, and a working group of Mobile Multi-hop Delay in IEEE 802.16 has been established in March 2006, in order to dedicate to the multi-hop extension for the IEEE 806.16 standard. The construction of the multi-hop relay network realizes the increase in the capacity and coverage of the WiMAX system networks without any modification to the user terminal devices. In the multi-hop relay network, the data may reach its destination through the transmission via multiple relay stations. Obviously, longer transmission latency is brought with respect to the single-hop relay network. Therefore, it is more necessary to effectively decrease the latency of relay transmission in the multi-hop relay networks.

FIG. 1 illustrates a simple wireless relay network comprising a base station (BS), a relay station (RS) and a subscriber station SS. FIG. 2 shows the data flow chart in the relay station in the prior art. A brief description is given as follows: after the relay station receives PDUs in Media Access Control layer (MAC PDUs) from its superordinate network node, it de-cascade, de-segment or de-capsulate the MAC PDUs in order to obtain Service Data Units in MAC layer (MAC SDUs), and put them into queues providing different QoS service, by categories. At last, a scheduler retrieves MAC SDUs from the corresponding queue by a certain scheduling scheme, based on the requirement for providing QoS service, and cascades, segments, and encapsulates the MAC SDU in order to generate new MAC PDUs for sending to the subordinate network node. In this procedure, the de-cascade, de-segmenting or de-capsulating the MAC PDUs in order to obtain MAC SDUs is one main cause to the latency of relay transmission. For a better understanding of the aforesaid latency of relay transmission caused by the procedure of de-cascading, de-segmenting or de-capsulating the MAC PDUs, an example given as follows: one large MAC SDU is divided and put into two MAC PDUs, which are denoted as MAC PDU1 and MAC PDU2. And these two MAC PDUs are carried in two different successive MAC frames. In the assumption that the employed frame time slot is 10 ms, after the frame for MAC PDU1, carrying one part of the MAC SDU, reaches the relay station, another 10 ms needs to be waited for before the next frame for MAC PDU2, carrying another part of the MAC SDU, reaches the relay station. The relay station can't extract the complete content of the MAC SDU from MAC PDU1 and MAC PDU2 so as to re-assemble the complete and correct MAC SDU, until the relay station receives both of the above two frames. Such waiting time may be even several frame time slots or longer, instead of just the above one frame time slot. It is apparent that the above waiting latency will become worse with the increase of the number of relay hops and the number of segmentations of the divided MAC SDU, which causes that the latency of the data from the source to the destination, through the transmission via multiple relay stations, will increase by a large degree.

SUMMARY OF THE INVENTION

Therefore, the invention provides a method and a device for data relay transmission in a wireless relay communication network, in order to address the aforesaid problem of latency, caused by the steps of de-cascading, de-segmenting or de-capsulating the input MAC PDUs in order to obtain the MAC SDUs.

According to the first aspect of the invention, it is provided a method of relaying, in relay stations of a wireless relay communication network, for data relay transmission, characterized in that, the method comprises the stops of: a. obtaining egress CID related information corresponding to input MAC: PDUs, according to the input PDUs; b. generating output MAC PDUs including the egress CID related information, based on the input MAC PDUs; c. performing QoS scheduling for the output MAC PDUs according to the egress CID related information, based on a predefined rule, so as to output in sequence of QoS. For a single MAC PDU, the aforesaid three steps a, b and c are executed sequentially; for a plurality of MAC PDUs contained in the relay station, the aforesaid three steps may be executed in parallel. According to the second aspect of the invention, there is provided a device of relaying, in wireless relay communication network, for data relay transmission, characterized in that, the device comprises:

an obtaining means, configured to obtain egress CID related information corresponding to input MAC PDUs, according to the input MAC PDUs;

a generator, configured to generate output MAC PDUs including the egress CID related information, based on the input MAC PDUs;

an output means, configured to perform QoS scheduling for the output MAC PDUs according to the egress CID related information, based on a first predefined rule, so as to output MAC PDUs in the sequence of QoS.

As described above, the relay station obtains egress CID related information corresponding to input PDUs entering the relay station, according to the input PDUs. The relay station then generates output PDUs including the egress CID related information, based on the input PDUs directly. And finally the relay station pert performs QoS scheduling for the output MAC PDUs according to the egress CID related information, based on a predefined rule, so as to output in the sequence of QoS. In this way, the invention omits the steps, in the current method for relay transmission, of de-cascading, de-segmenting or de-capsulating the MAC PDUs in order to obtain MAC SDUs, omits the step of scheduling the MAC CPU by category, and omits the steps of cascading, segmenting, and encapsulating the MAC SDUs in order to re-generate the MAC PDUs, thus the invention thoroughly cancels the waiting latency in the procedure of reconstructing the input MAC PDUs into the complete and correct MAC SDUs, and simplifies the data processing procedure of the relay station and achieves the goal of decreasing the latency of relay transmission. Additionally, before the relay station generates the output MAC PDUs based on MAC PDUs input into the relay station, it can schedule and arrange the input MAC PDUs based on the ingress CID information therein, so as to further improve the QoS service performance of the relay station.

BRIEF DESCRIPTION OF THE DRAWINGS

Other features, aspects and advantages of the present invention will become obvious by reading the following description of several non-limiting embodiments with the aid of appended drawings.

FIG. 13 is one schematic drawing of the stack processing for the CID: in the method for data relay transmission according to the fourth embodiment of the invention;

Wherein, same or similar reference numerals refer to the same or similar components.

DETAILED DESCRIPTION OF THE EMBODIMENTS

In order to effectively decrease the latency in the data relay transmission, the invention provides methods and devices, in wireless relay communication network, for data relay transmission, wherein, the data processed and transferred by the relay station is PDU (Protocol Data Unit), which includes the MAC PDU in the MAC layer. In the following part, MAC PUP will be taken as the data processed and transferred by the relay station in order to describe the invention. The core concept of the invention is that: the relay station obtains egress CID related information corresponding to input MAC PDUs entering the relay station, according to the input MAC PDUs; the relay station then generates output MAC PDUs including the egress CID related information, based on the input MAC PDUs entering the relay station; And finally the relay station performs QoS scheduling for the output MAC PDUs according to the egress CID related information, bared on a predefined rule, so as to output in the sequence of QoS. The invention omits the steps of de-cascading, de-segmenting or de-capsulating the MAC PDUs in order to obtain MAC SDUs, omits the steps of scheduling the MAC SDU by category, and omits the steps of cascading, segmenting, and encapsulating the MAC SDUs in the current method for relay transmission, in order to re-generate the MAC PDUs. Thus the invention simplifies the data processing procedure and achieves the goal of decreasing the latency of data relay transmission. Additionally, before the relay station generates the output MAC PDUs based on the MAC PDUs input into the relay station, it can make certain schedule and arrangement for the input MAC PDUs based on the ingress CID information therein, so as to further improve the QoS service performance of the relay station.

Figure 1:
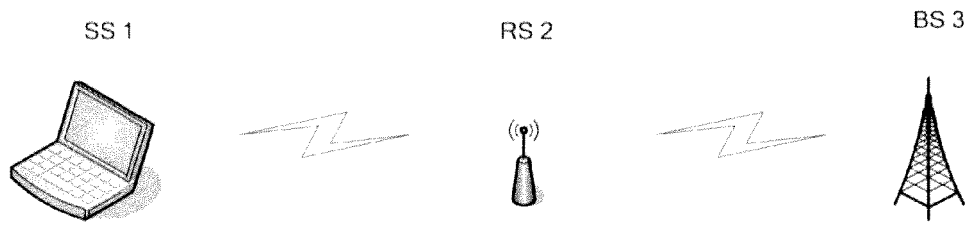
FIG. 1 is a schematic drawing of a simple wireless relay network comprising a base station (BS), a relay station (RS) and a subscriber station (SS)
Figure 2:
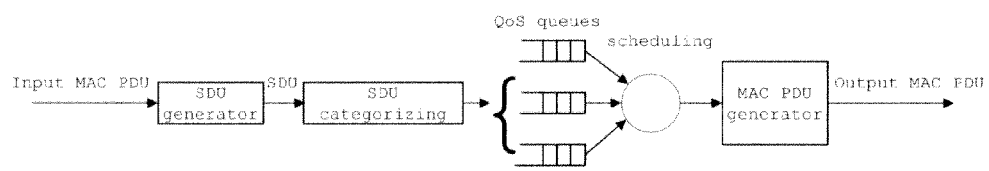
FIG. 2 is a data flow chart in the relay station in the prior art.

As to a wireless communication system, it comprises serving base stations (BS), subscriber stations (SS)/mobile subscriber stations (MSS), and relay stations (RS). The subscriber stations/mobile subscriber stations can be portable consumer electronics such as cell phone, personal digital assistant (PDA) and notebook. The communication from the subscriber stations/mobile subscriber stations to the server base station can pass through one relay station it is called as single-hop relay), or pass more than one relay stations (that is called as multi-hop relay). Thus, for a relay station, its superordinate network node comprises: base stations, subscriber stations/mobile subscriber stations, or relay stations, and it subordinate network node also comprises: base stations, subscriber stations/mobile subscriber stations, or relay stations. FIG. 1 illustrates a simple wireless single-hop relay network which only comprises a serving BS, a SS and a RS. For simplification, the following part will describe the invention by taking this network as example. Those skilled in the art would understand that the invention is also applicable for wireless relay networks comprising multiple SSs/MSs and multi-hop relay stations and multiple BSs. At the receiving input end of the RS, the RS receives data frames sent by its superordinate network node via the PHY layer, and the relay station carries through processing for the data frames in the MAC layer, such as removing the frame header, in order to obtain the input MAC PDUs. At the sending output end of the RS, the RS carries through processing for the output MAC PDUs to be transmitted in the MAC layer, such as adding the frame header, in order to generate data frames. And at last the RS sends the data frames via the PHY layer. These processing steps are well-known to those skilled in the art, and the following part will not give unnecessary description for simplification. Besides, the invention further comprise the procedures of: obtaining egress CID related information according to the input MAC PDUs, then generating output MAC PDUs including the egress CID related information based on the input MAC PDUs, and at last scheduling and outputting the output MAC PDUs according to a sequence of QoS. The embodiments of the invention will be described in the following part in details by referring to the drawings.

Figure 3:
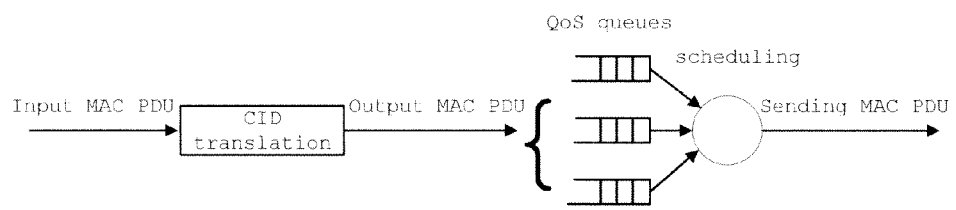
Figure 4:
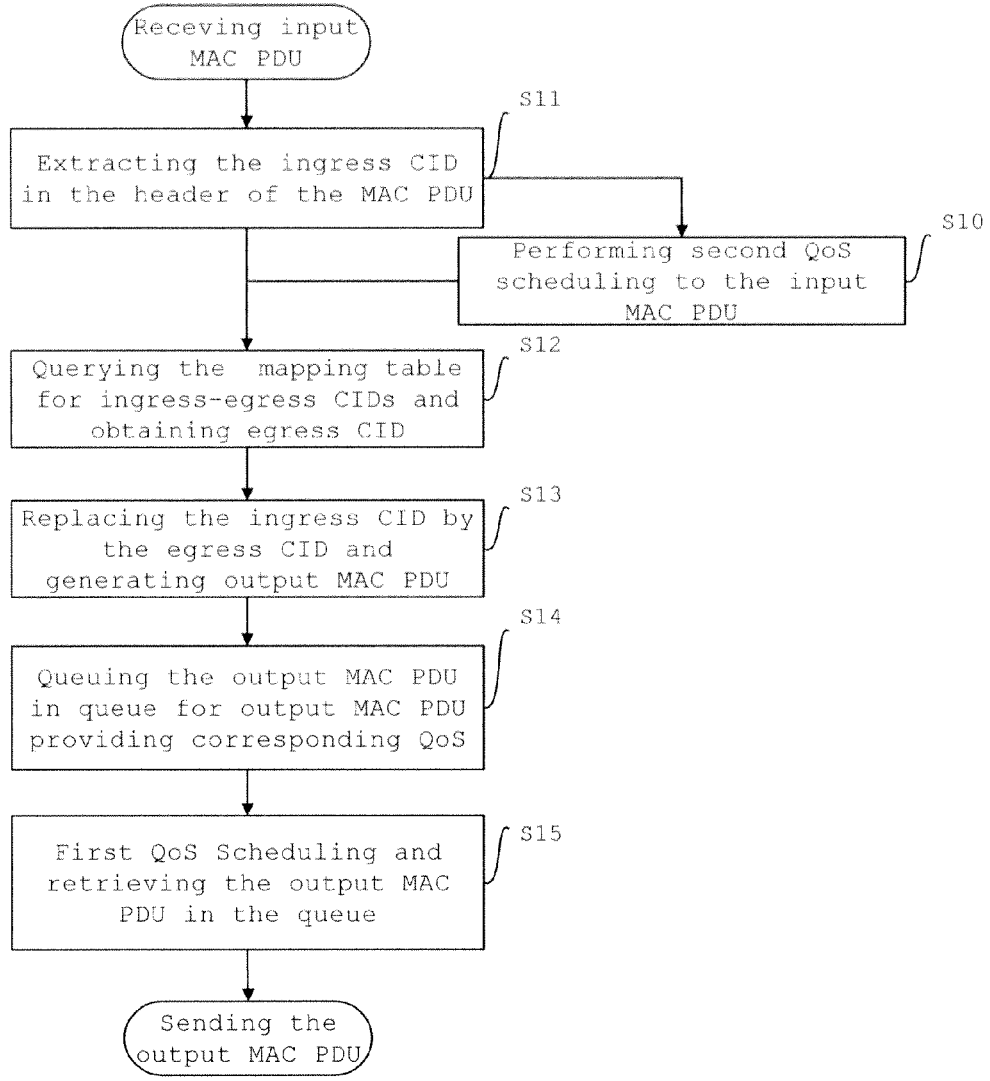
FIG. 4 is a flowchart of the method for data relay transmission, in relay stations of a wireless relay communication network, according to the first embodiment of the invention.

FIG. 4 is a flowchart of the method for data relay transmission in relay stations, according to the first embodiment of the invention. The invention will be described in the following part in details by referring to this figure accompanied with FIG. 1 and FIG. 3.

Specifically, in step S11, the RS extracts the ingress CID information, such as ingress CID=0x18, from the header of the input MAC PDG, which entered the RS;

After that, in step S12, the RS takes the extracted ingress CID=0x18 as an index, and queries a mapping table for ingress-egress CIDs, which is pre-stored in the RU, so as to obtain the egress CID corresponding to the ingress CID.

Wherein, the mapping table for ingress-egress CIDs is a mapping table stored in the RS, which identifies the mapping relationship from one or more ingress CIDs to one or more egress CIDs. The table comprises an ingress CID list and an egress CID list, and defines the mapping relationship from ingress CID to egress CID. According to the number of the ingress CIDs and egress CIDs, the mapping relationship of the ingress-egress CIDs comprises: one-to-one (1:1) mapping, many-to-one (M:1) mapping and many-to-many (M:N) mapping, wherein M and N are natural numbers, M stands for the number of the ingress CIDs in the mapping table for ingress-egress CIDs, and N stands for the number of the egress CIDs in the mapping table for ingress-egress CIDs. A simple example of the mapping table for ingress-egress CIDs is illustrated by the following table 1:

TABLE 1

| Serial No. | Ingress CID | Egress CID |
|---|---|---|
| 1 | 0 × 18 | 0 × 3f |
| 2 | 0 × 54 | 0 × 8b |
| 3 | . . . | . . . |

Those skilled in the art should understand that this table is just a simple example of the mapping table for ingress-egress CIDs, which is not limited by the inclusion of only ingress CIDs and egress CIDs information and can further comprises information such as SFID (service flow identification) and QoS type. Unnecessary description will not be given further.

By querying the mapping table for ingress-egress CIDs, the egress CID corresponding to the ingress CID can be obtained. For example, as shown in table 1, it is egress CID=0x3f that corresponds to ingress CID=0x18. An input MAC PDU can be deemed as illegal data thus discarded, in case that none egress CID, which corresponds to the ingress CID, can be found in the mapping table for ingress-egress CIDs.

Figure 5:
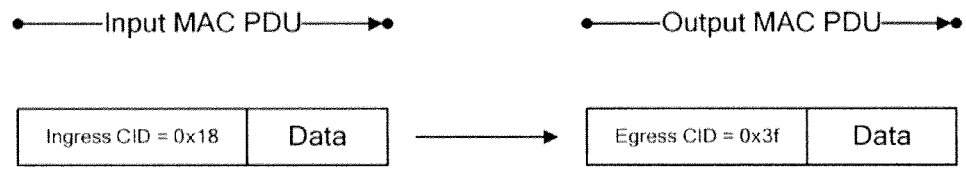
FIG. 5 is a schematic drawing of the CID-translation carried through in the method for data relay transmission, according to the first embodiment of the invention.

Then, in step S13, as shown in FIG. 5, the method of CID translation is used, and the ingress CID-0x18 is replaced by the egress CID=0x3f in the header of the input MAC PDU while the rest of the input MAC PDU is reserved, so as to generate the output MAC PDU shown in FIG. 5. In case that correction bits (including HCS for header correction and/or CRC data correction bits) is contained in the MAC PDU, it is necessary to recalculate and update the correction bits of the output MAC PDU, and this is well-known to those skilled in the art thus necessary description will not be given.

After that, in step 214, the relay station places the output MAC PDU into a queue for output MAC PDUs providing the corresponding QoS, according to the ogress CID=0x3f the SIB relates to corresponding QoS information). Thus the output MAC PDU is queued. Those skilled in the art knows that: the IEEE 802.16 standard defines 5 different types for scheduled service in order to provide differentiated QoS service, and these types for scheduled service comprises the following types by the QoS priority from high to low: unsolicited grant service (UGS), real-time polling service (rtPS), extended real-time polling service (ertPS), non-real-time polling service (nrtPS) and best effort (BE) service.

Figure 6:
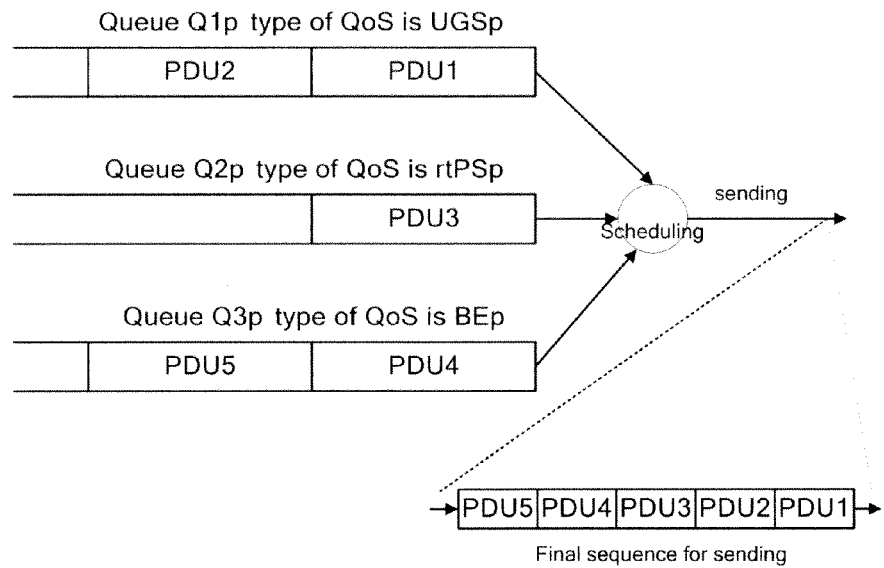
FIG. 6 is one schematic drawing of scheduling and sending the output MAC PDUs according to the method for data relay transmission of the invention.

Specifically, the step S14 is shown in FIG. 6. For example, the relay station provides 3 types for QoS service: unsolicited grant service (UGS), real-time polling service (rtPS) and best effort (BE) service. For these types, the relay station provides 3 queues for output MAC PDUs, which are queue Q1 (the type for QoS is UGS), queue Q2 (the type for QoS is rtPS) and queue Q3 (the type for QoS is BE). PDU1, PDU2, PDU3, PDU4 and PDU5 are generated output MAC PDUs. And the relay station queues these MAC PDUs according to their egress CID contained therein. For example, the type for QoS corresponding to the egress CID contained in PDU1 and PDU2 is UGS, thus these two PDUs are placed in queue Q1; the type for QoS corresponding to the egress CID contained in PDU3 is rtPS, thus this PDU is placed in queue Q2; the type for QoS corresponding to the egress CID contained in PDU4 and PDU5 is DE, thus these two PDUs are placed in queue Q3.

At last, in step S15, the relay station selects corresponding queues for output MAC PDUs according to the sequence of QoS, based en a first predefined rule, and retrieves the output MAC PDUs contained therein for sending.

In conjunction with FIG. 6 again, the relay station provides three queues for output MAC PDUs: the first queue Q1, whose type for QoS is UGS (queue Q1 for short), the second queue Q2, whose type for QoS is rtPS (queue Q2 for short), and the third queue Q3, whose type for QoS is BE (queue Q3 for short). Currently, queue Q1 includes two output MAC PDUs to be sent: PDU1 and PDU2, queue Q2 includes one output MAC PDU to be sent: PDU3, and queue Q3 includes two output MAC PDUs to be sent: PDU4 and PDU5. According to the sequence of QoS priority, the relay station firstly schedules and selects the queue Q1, whose QoS priority is the highest, and retrieves PDU1 and PDU2 therein for sending. After all the output MAC PDUs in queue Q1 have been retrieved, the relay station schedules and selects the queue Q2, whose QoS priority is the second highest, and retrieves PDU3 therein for sending. After all the output MAC PDUs in queue Q2 have been retrieved, the relay station schedules and selects the queue Q3, whose QoS priority is the lowest, and retrieves PDU4 and PDU5 therein for sending. Thus, the final sequence for sending data is: PDU1-PDU2-PDU3-PDU4-PDU5.

Figure 7:
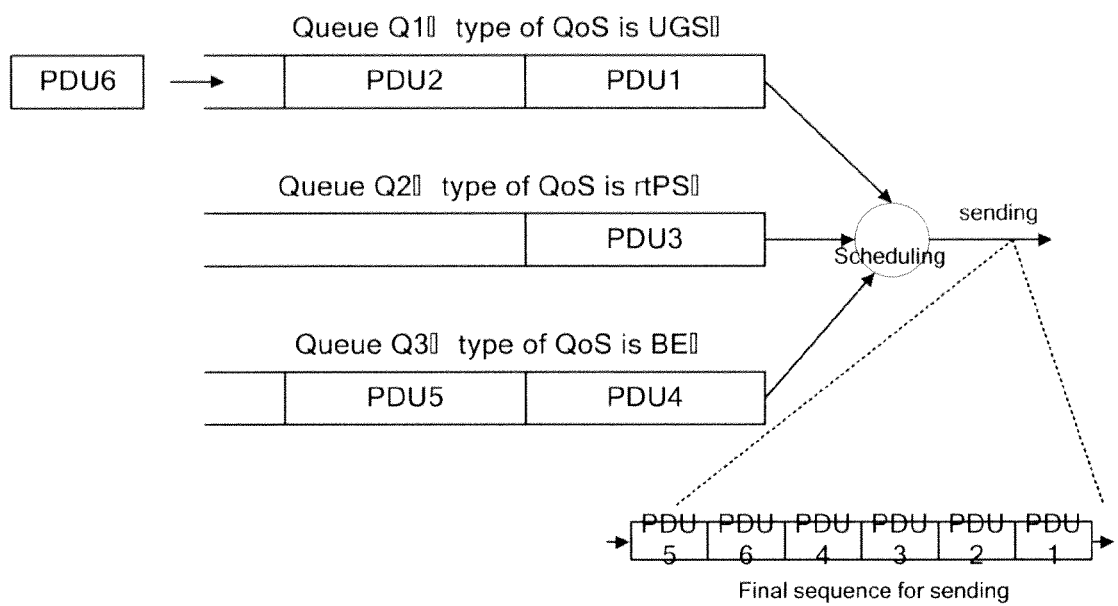
FIG. 7 is another schematic drawing of scheduling and sending the output MAC PDUs according to the method for data relay transmission of the invention.

Preferably, during the above procedure of scheduling and sending, once the relay station detects that new output MAC PDUs enter the queue for output MAC PDUs with a higher priority, the relay station will suspend the processing to the current queue for output MAC PDU, and switch to schedule the aforesaid queue for output MAC PDU with a higher priority. The relay station will retrieve the newly-entering out MAC PDU for sending. After completing the retrieval of all the newly-entering output MAC PDU in the queue for output MAC PDU with higher priority, the relay station will return to schedule the queue for output MAC PDU, to which processing was suspended previously. By reference with FIG. 7, for example, when the relay station is processing queue Q3 in the aforesaid scheduling procedure, at the moment it has retrieved PDU4 therein and is about to retrieve PDU5 therein, a new data PDU6 is entering queue Q1. Thus, the relay station suspends the retrieval processing to queue Q3, switches to queue Q1, and retrieves the newly-entering PDU6 for sending. Thus the queue Q1 is flushed again, and after that the relay station returns to schedule the suspended queue Q3 and retrieves the left PDU5 for sending. Thus, the final sequence for sending data is: PDU1-PDU2-PDU3-PDU4-PDU6-PDU5.

As to the present embodiment, preferably, a step S10 is comprised between the step S11 and the step S12, as shown in FIG. 4 again. In step S10, the relay station places the input MAC PDUs into queues for input PDUs providing a corresponding QoS, according to the ingress CID extracted in the step S11. And then, the relay station selects corresponding queues for input MAC PDUs according to the sequence of QoS, based on a second predefined rule, and retrieves the input MAC PDUs contained therein.

For this sake, the relay station offers several queues for input MAC PDUs providing different types for QoS service: the input MAC PDU entering the relay station is placed in the corresponding queue for input MAC PDUs, according to the ingress CID extracted in the step S11. After that, the relay station preferably selects the queues for input MAC PDUs with high QoS priority by the sequence of QoS from high to low, and retrieves the input MAC PDUs therein. After the queue for input MAC PDU with high QoS priority has been flushed, the relay station switches to schedule the queue for input MAC PDUs with secondary high QoS priority and retrieves the input MAC PDUs therein. The process proceeds in the same mariner until the queue for input MAC PDU with the lowest priority is processed.

Preferably, during the above procedure of scheduling and selecting, once the relay station detects that new input MAC PDUs enter the queue for input MAC PDU with a higher priority, the relay station will suspend the processing to the current queue for input MAC PDU, and switch to schedule the aforesaid the queue for input MAC PDU with the higher priority. After completing the retrieval of all the newly-entering input MAC PDU in the queue for input MAC PDU, the relay station will return to schedule the queue for input MAC PDU with lower QoS priority, to which processing was suspended previously. The specific implementation is very similar to the processing procedure to the output MAC PDUs executed in the step S15, thus the specification won't describe it in details with examples.

Figure 8:
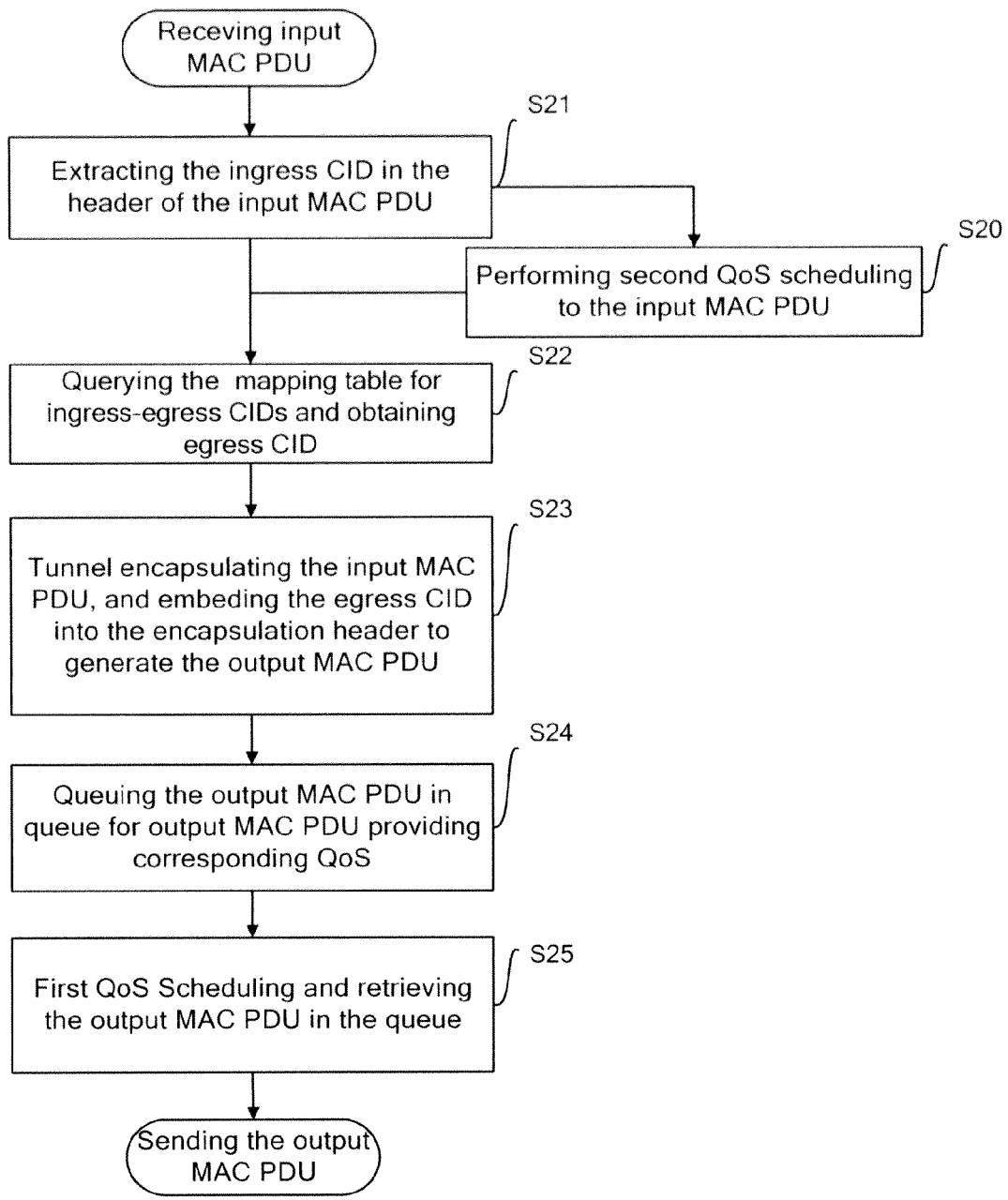
FIG. 8 is a flowchart of the method for data relay transmission, in relay stations of a wireless relay communication network, according to the second embodiment of the invention.

FIG. 8 is a flowchart of the method for data relay transmission in relay stations, according to the second embodiment of the invention. The invention will be described in the following part in details by referring to this figure accompanied with FIG. 1 and FIG. 3.

Specifically, in this embodiment, step S21 and step S22 are the same as step S11 and step 112 in the if first embodiment, and will not be described here. For example, the ingress CID-0x18 the input MAC 000 header is extracted via step 121, and egress CID-0x3f is obtained via step S22.

Figure 9:
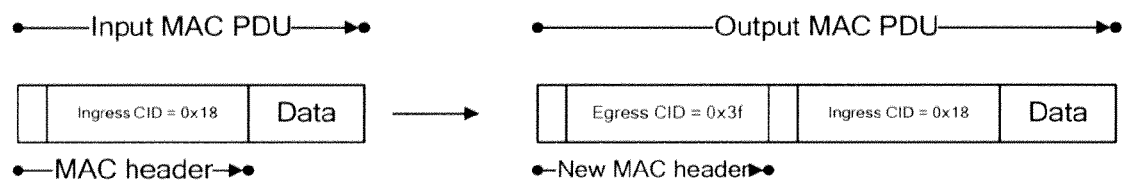
FIG. 9 is a schematic drawing of the tunneled encapsulation for the CID in the method for data relay transmission according to the second embodiment of the invention.

After that, the relay station uses the method of tunneling encapsulation, and adds a new header to the input MAC Pal for tunneling encapsulation. As shown in FIG. 9, the relay station embeds the egress CID-0x3f into the new header after the encapsulation, so as to generate an encapsulated output MAC PDU. In case that correction bits (including HCS for header correction and/or CRC data correction bits) is contained in the MAC PDU, it is necessary to recalculate and update the correction bits of the output MAC PDU, and this is well-known to those skilled in the art thus unnecessary description will not be given. The step S24 and step S25 in the present embodiment are the same as step S14 and step S15 in the above first embodiment, and will not be described here. As to this embodiment, equally, it is preferable that step S20, which is the same as step S10 in the first embodiment, is comprised between step S21 and step S22. The specification won't give unnecessary description.

Figure 10:
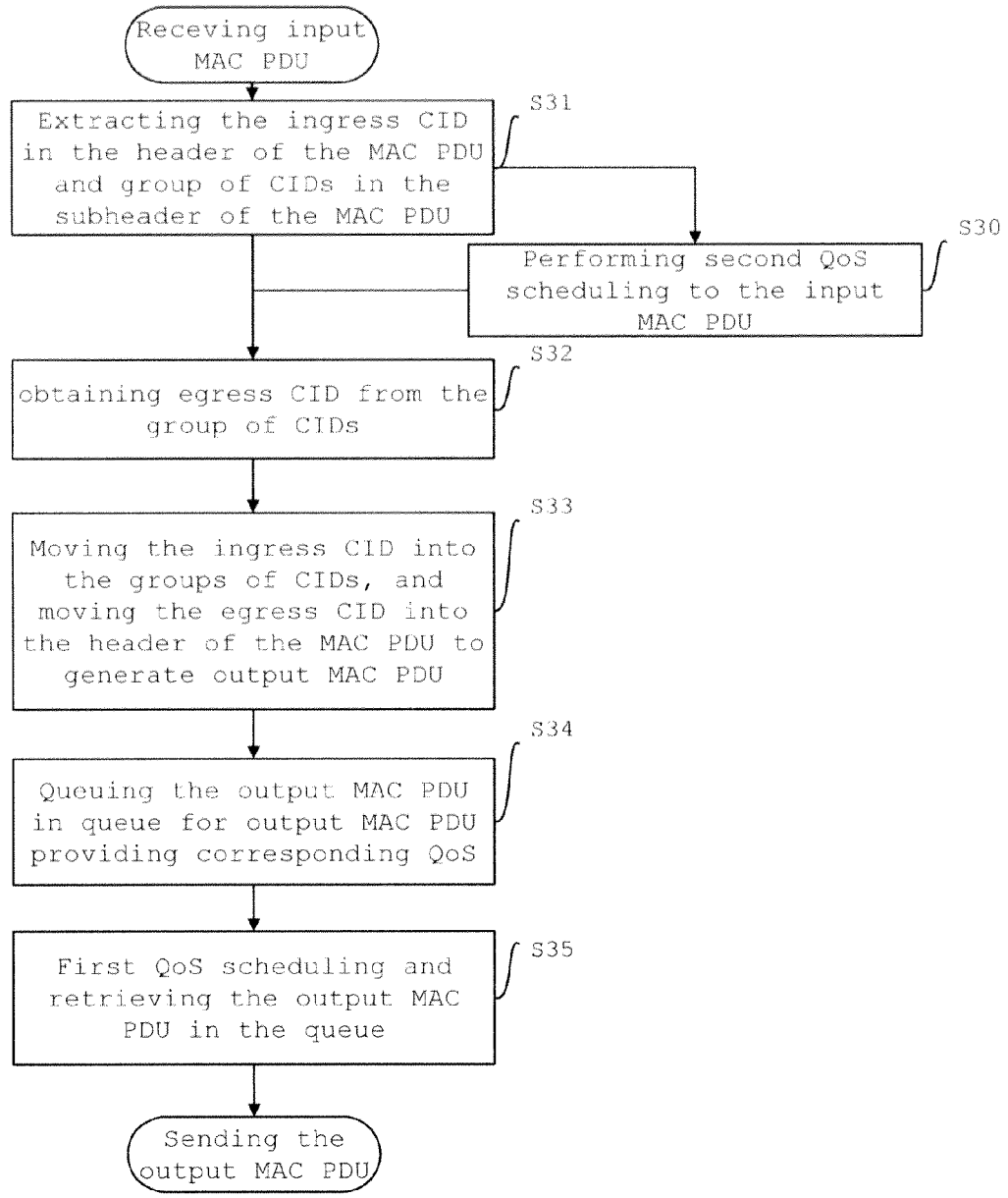
FIG. 10 is a flowchart of the method for data relay transmission, in relay stations of a wireless relay communication network, according to the third embodiment of the invention.

FIG. 10 is a flowchart of the method for data relay transmission in relay stations, according to the third embodiment of the invention. The invention will be described in the following part in details by referring to this figure accompanied with FIG. 1 and FIG. 3.

The subheader of the input MAC PDU comprises a group of CIDs, which includes one or more egress CIDs corresponding to one or more relay hops of the transmission path for the input MAC PDU. In step S31, the relay station extracts the ingress CID information from the header of the input MAC. PDU, and extracts the group of CIDs from the subheader of the input MAC PDU. The extracted group of CIDs includes one or more egress CIDs corresponding to one or more relay hops of the transmission path for the input MAC PDU.

After that, in step S32, the relay station extracts the CID corresponding to the present relay hop from the group of CIDs, and takes this CID as the egress CID.

Then, in step S33, the relay station moves the ingress CID into the group of CIDs in the subheader of the input MAC PDU, and places the egress CID extracted from the group of CIDs into the header of MAC PDU, so as to generate the output MAC PDU. What is to be noticed is that the number of CIDs in the group of CIDs does not change.

Figure 11A:
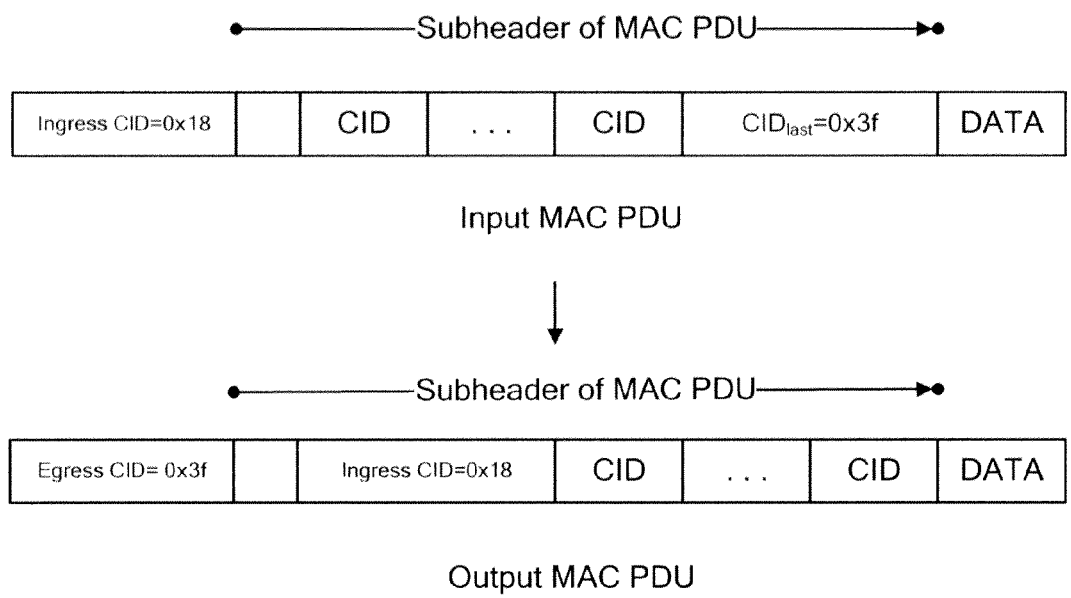
FIG. 11a is one schematic drawing of the list wrap around for the CIDs in the method for data relay transmission according to the third embodiment of the invention.
Figure 11B:
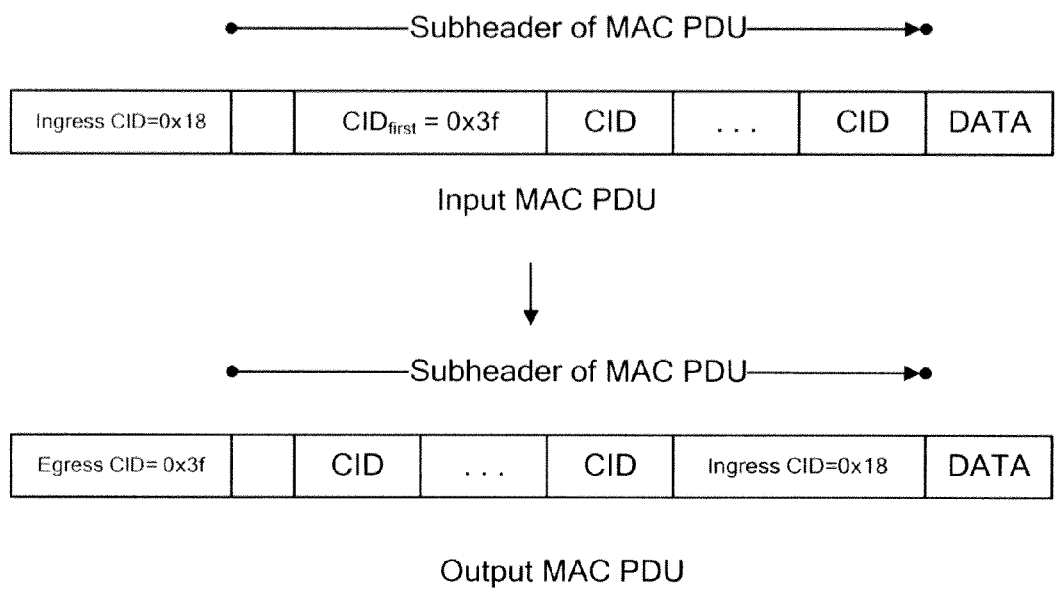
FIG. 11b is another schematic drawing of the list wrap around for the CIDs in the method for data relay transmission according to the third embodiment of the invention.

Specifically, the aforesaid group of CIDs is taken as a CID queue, and the ingress CID is 0x18. In uplink transmission, as shown in FIG. 11*a*, the relay station moves the ingress CID=0x18 out of the header of the input MAC PDU to the first position of the CID queue in the subheader of the input MAC PDU, and moves the $CID_{last}$=0x3f in the last position of the CID queue into the header of the input MAC PDU, as the new egress CID, so as to generate the output MAC PDU. In downlink transmission, as shown in FIG. 11*b*, the relay station moves the ingress CID-0x18 out of the header of the input MAC PDU to the last position of the CID queue in the subheader of the input MAC PDU, and move the $CID_{first}$=0x3f in the first position of the CID queue into the header of the input MAC PDU, as the new egress CID, so as to generate the output MAC PDU. In case that correction bits (including HCS for header correction and/or CRC data correction bits) is contained in the MAC PDU, it is necessary to recalculate and update the correction bits of the output MAC PDU, and this is well-known to those skilled in the art thus unnecessary description will not be given.

The step S34 and step S35 in the present embodiment are the same as step S14 and step S15 in the above first embodiment, and will not be described here. As to this embodiment, equally, it is preferable that step S30, which is the same as step S10 in the first embodiment, is comprised between step S31 and step The specification won't give unnecessary description.

Figure 12:
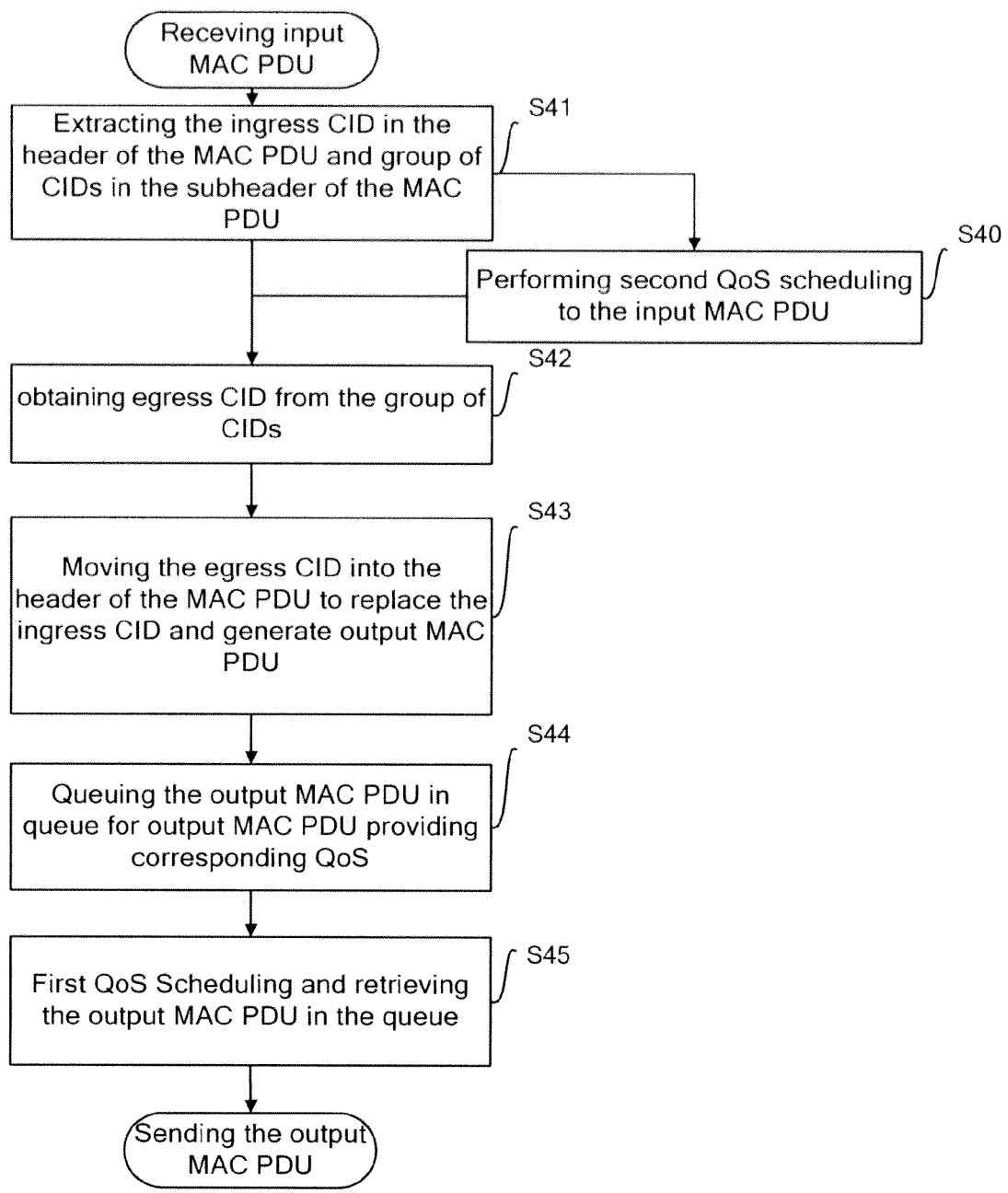
FIG. 12 is a flowchart of the method for data relay transmission, in relay stations of a wireless relay communication network, according to the fourth embodiment of the invention.

FIG. 12 is a flowchart of the method for data relay transmission in relay stations, according to the fourth embodiment of the invention. The invention will be described in the following part in details by referring to this figure accompanied with FIG. 1 and FIG. 3.

The subheader of the input MAC PDU comprises a group of CIDs, which includes one or more egress CIDs corresponding to one or more relay hops of the transmission path for the input MAC PDU. In step S41, the relay station extracts the ingress CID information from the header of the input MAC PDU, and extracts the group of CIDs from the subheader of the input MAC PDU. The extracted group of CIDs includes one or more egress CIDs corresponding to one or more relay hops of the transmission path for the input MAC PDU.

After that, in step S42, the relay station extracts the CID corresponding to the present relay hop from the group of CIDs, and takes this CID as the egress CID.

Figure 13:
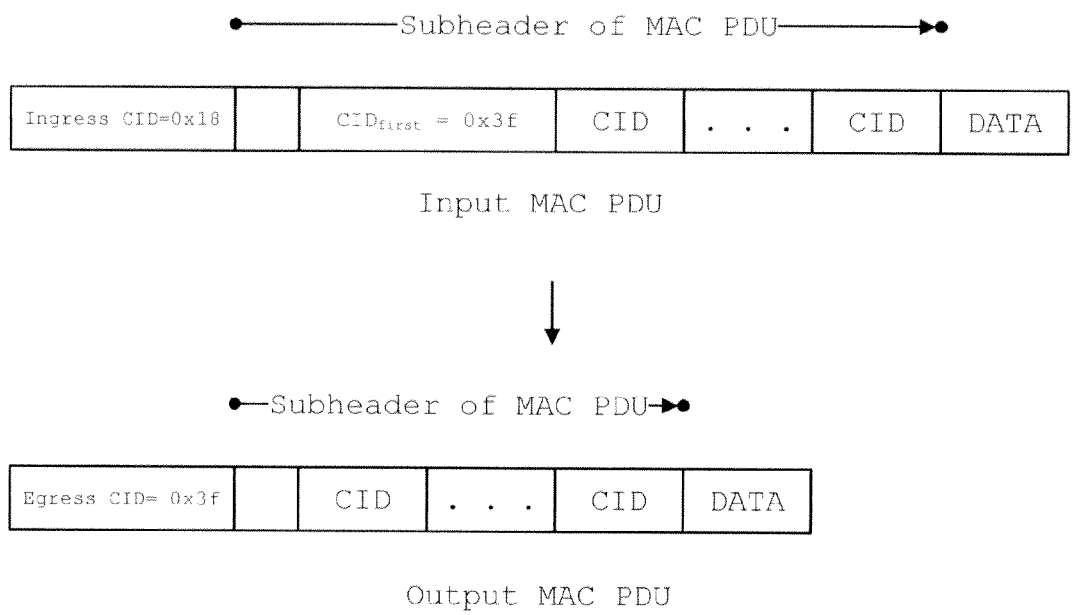
FIG. 13 is a data flow chart in the relay station in the invention.

Then, in step S43, the relay station replaces the ingress CID in the header of the input MAC PDU, by the egress CID, so as to generate the output MAC PDU. What is to be noticed is that the number of CIDs in the group of CIDs decreases by one. Specifically, as shown in FIG. 13, for example, the group of CIDs is taken as a stack, the egress CID-0x18 and the first CID=0x3f on the top of the stack is taken out as the egress CID, and is used to replace the ingress CID=0x18 in the header of the input MAC PDU, so as to generate the output MAC PDU. In case that correction bits (including HCS for header correction and/or CRC data correction bits) is contained in the MAC PDU, it is necessary to recalculate and update the correction bits of the output MAC. PDU, and this is well-known to those killed in the art thus unnecessary description will not be given.

The step S44 and step S45 in the present embodiment are the same as step S14 and step S15 in the above first embodiment referring to FIG. 4, and will not be described here. As to this embodiment, equally, it is preferable that step S40, which is the same as step S10 in the first embodiment, is comprised between step S41 and step S42. The specification won't give unnecessary description.

Figure 14:
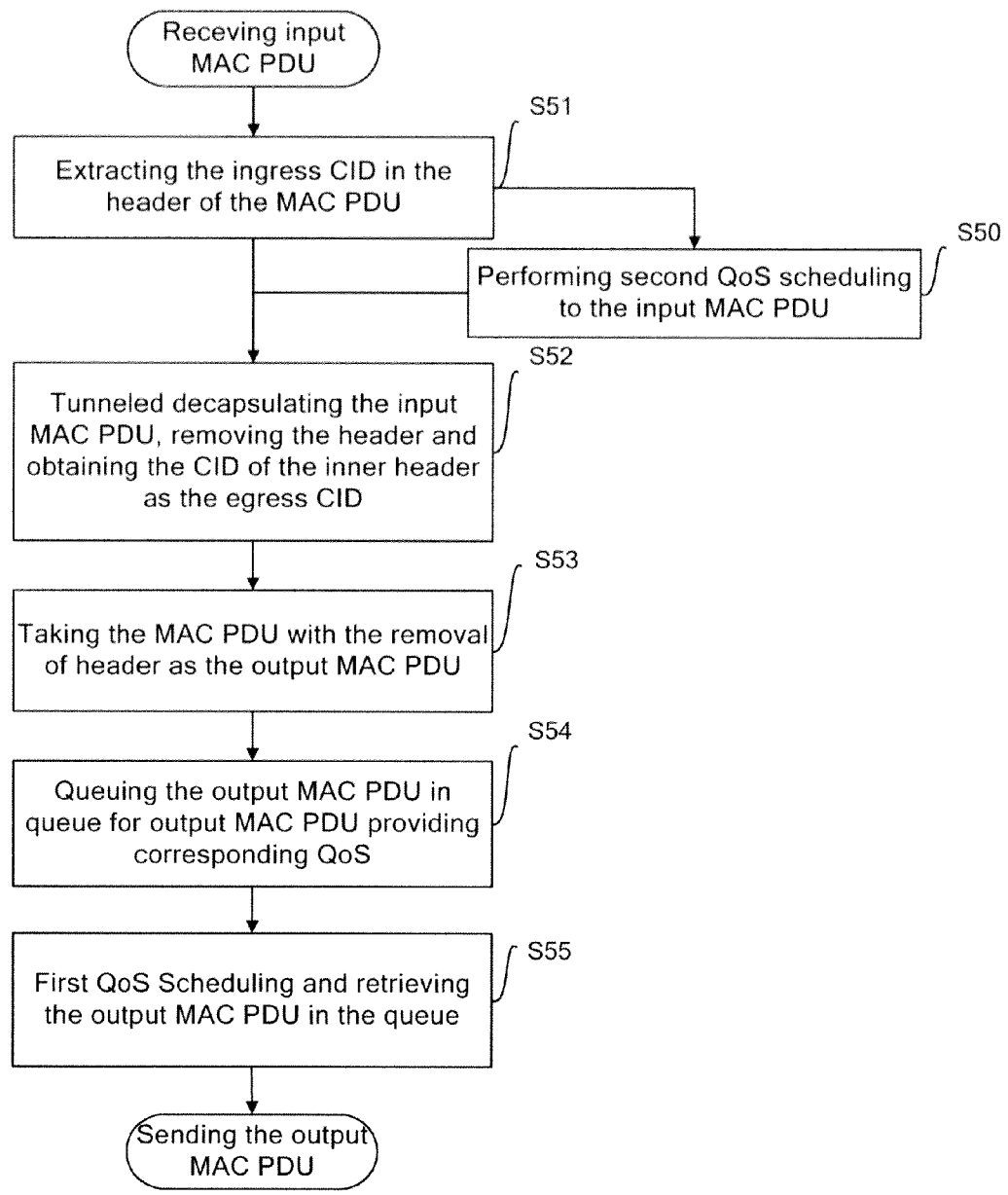
FIG. 14 is a flowchart of the method for data relay transmission, in relay stations of a wireless relay communication network, according to the fifth embodiment of the invention.

FIG. 14 is a flowchart of the method for data relay transmission in relay stations, according to the fifth embodiment of the invention. The invention will be described in the following part in details by referring to this figure accompanied with FIG. 1 and FIG. 3.

The input MAC PDU includes one or more encapsulation headers, each of which includes the egress CID corresponding to one or more relay hops of the transmission path for the input MAC PDU. In step S51, the relay station extracts the ingress CID information from the header of the input MAC PDU.

Figure 15:
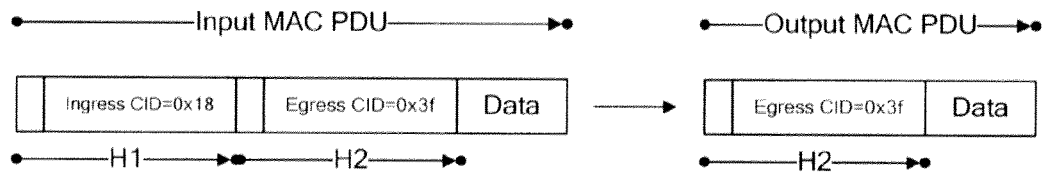
FIG. 15 is a schematic drawing of the tunneled de-capsulation for the CIDs in the method for data relay transmission according to the fifth embodiment of the invention.

Then, in step S52, as shown in FIG. 15, the relay station decapsulates the input MAC PDU, and removes its header H1 which contains the ingress CID, thus the header H2 encapsulated therein becomes the new header of the MAC PDU, and the CID contained in the header H2 becomes the egress CID.

Then, in step S53, the relay station takes the decapsulated MAC PDU, namely the MAC PDU with the removal of header H1, as the output MAC PDU. In case that correction bits (including HCS for header correction and/or CRC data correction bits) is contained in the MAC PDU, it is necessary to recalculate and update the correction bits of the output MAC PDU, and this is well-known for those skilled in the art thus unnecessary description will not be given.

The step S54 and step S55 in the present embodiment are the same as step S14 and step S15 in the above first embodiment, and will not be described here. As to this embodiment, equally, it is preferable that step S50, which is the same as step S10 in the first embodiment, is comprised between step S51 and step S52. The specification won't give unnecessary description.

Figure 16:
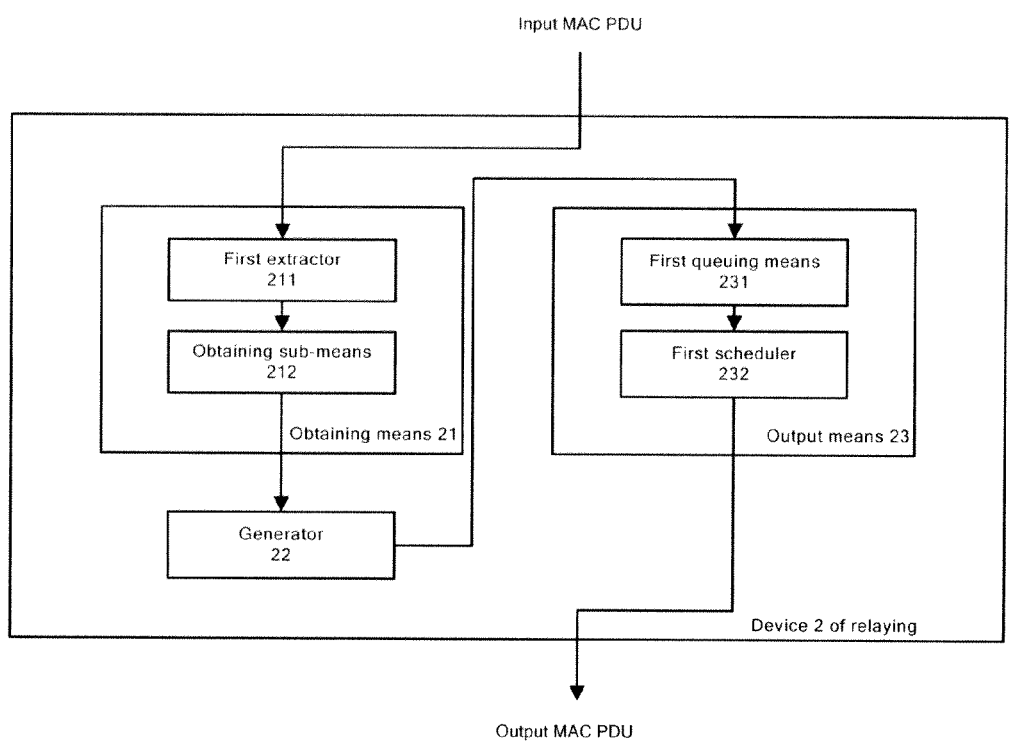
FIG. 16 is a block diagram of one device for data relay transmission, in wireless relay communication networks, according to the invention.

According to another aspect of the invention, it is provided a device 2 of relaying, in wireless relay network, for data relaying transmission. FIG. 16 shows the block diagram of the device of relaying, and the device comprises: an obtaining means 21, a generator 22 and an output means 23. Wherein, the obtaining means 21 comprises a first extractor 211 and an obtaining sub-means 212, and the output means 23 comprises a first queuing means 231 and a first scheduler 232.

The device of relaying for data relay transmission, according to the first embodiment of the invention, will be described in the following part in details by referring to FIG. 16 accompanied with FIG. 1 and FIG. 3. And FIG. 4 and the aforesaid description, of the flow of the method in the first embodiment of the invention, are incorporated here as reference.

The first extractor 211 extracts the ingress CID information, such as ingress CID=0x18, from the header of the input MAC PDU, which entered the RS. And the first extractor 211 passes the ingress ID 0x18 information along with the input MAC PDU to the obtaining sub-means 212.

The obtaining sub-means 212 takes the extracted ingress CID=0x18 as an index, and queries a mapping table for ingress-egress CIDs, which is pre-stored in the RS, so as to obtain an egress CID corresponding to the ingress CID.

Wherein, the mapping table for ingress-egress CIDs is a mapping table stored in the RS, which identifies the mapping relationship from one or more ingress CIDs to one or more egress CIDs. The table comprises an ingress CID list and an egress CID list, and defines the mapping relationship from the ingress CID to the egress CID. According to the number of the ingress CIDs and egress CIDs, the mapping relationship of the ingress-egress CIDs comprises: one-to-one (1:1) mapping, many-to-one (M:1) mapping and many-to-many (M:N) mapping, wherein M and N are natural numbers, M stands for the number of the ingress CIDs in the mapping table for ingress-egress CIDs, and N stands for the number of the egress CIDs in the mapping table for ingress-ogress CIDs. A simple example of the mapping table for ingress-egress CIDs is illustrated by the following table 2:

TABLE 2

| Serial No. | Ingress CID | Egress CID |
|---|---|---|
| 1 | 0 × 18 | 0 × 3f |
| 2 | 0 × 54 | 0 × 8b |
| 3 | . . . | . . . |

Those skilled in the art should understand that this table is just a simple example of the mapping table for ingress-egress CIDs, which is not limited by the inclusion of only ingress CIDs and egress CIDs information and can further comprises information such as SFID (service flow identification) and QoS type. Unnecessary description will not be given.

By querying the mapping table for ingress-egress CIDs, the obtaining sub-means 212 obtains the egress CID-0x3f corresponding to the ingress CID-0x18. The obtaining sub-means 212 deems an input MAC PDU as illegal data thus discards it, in case that the obtaining sub-means 212 cannot find any egress CID which corresponds to the ingress CID, in the mapping table for ingress-egress CIDs. After obtaining the egress CID, the obtaining sub-means 212 passes the egress CID-0x3f along with the input MAC PDU to the generator 22.

As shown in FIG. 5, the generator 22 uses the method of CID translation, replaces the ingress CID-0x18 in the header of the input MAC PDU by the egress CID=0x3f and reserves the rest of the input MAC PDU, so as to generate the output MAC PDU. In case that correction bits (including HCS for header correction and/or CRC data correction bits) is contained in the MAC PDP, it is necessary for the generator 22 to recalculate and update the correction bits of the output MAC PDU, and this is well-known to those skilled in the art thus unnecessary description will not be given. At last, the generator 22 passes the generated output MAC PDU to the first queuing means 231 in the output means 23.

The first queuing means 231 places the output MAC PDU into a queue for output MAC PDUs providing the corresponding QoS, for example according to the egress CID-0x3f (the CID relates to corresponding QoS information). Thus the output MAC PDC is queued. Those skilled in the art knows that: the IEEE 802.16 standard defines 5 different types for scheduled service in order to provide differentiated service, and these types for scheduled service comprises the following types by the QoS priority from high to low: unsolicited grant service (UGS), real-time polling service (rtPS), extended real-time polling service (ertPS), non-real-time polling service (nrtPS) and best effort (BE) service.

The case that the relay station provides 3 types for QoS services: unsolicited grant service (UGS), real-time polling service (rtPS) and best effort (BE) service is taken as an example to give a detailed description to the first queuing means 231. For these types, the relay station provides 3 queues for output MAC PDUs, which are queue Q1 (its type for QoS is UGS), queue Q2 (its type for QoS is rtPS) and queue Q3 (its type for QoS is BE). PDU1, P0U2, PDU3, PD04 and PDU5 are generated output MAC PDUs. And the first queuing means 231 queues these MAC PDUs according to their egress CID contained therein. For example, the type for QoS corresponding to the egress CID contained in PDU1 and PDU2 is UGS, thus these two PDUs are placed in queue Q1; the type for QoS corresponding to the egress CID contained in PDU3 is rtPS, thus this PDU is placed in queue Q2; the type for QoS corresponding to the egress CID contained in PDU4 and PDU 5 is BE, thus these two PDUs are placed in queue Q3. The first scheduler 232 selects queues for output MAC PDUs according to the sequence of QoS, based on a first predefined rule, and retrieves the output MAC PDUs contained therein for sending.

Similarly, the case that the relay station provides three queues for output MAC PDUs: queue Q1, whose type for QoS is UGS, queue Q2, whose type for QoS is rtPS, and queue Q3, whose type for QoS is BE is taken as an example to describe the first scheduler 232. Currently, queue Q1 includes two output MAC PDUs to be sent: PDU1 and PDU2, queue Q2 includes one output MAC PDU to be sent: PDU3, and queue Q3 includes two output MAC PDUs to be sent: PDU4 and PDU5. According to the sequence of QoS priority, the first scheduler 232 firstly schedules and selects the queue Q1, whose QoS priority is the highest, and retrieves PDU1 and PDU2 therein for sending. After all the output MAC PDUs in queue Q1 have been retrieved, the first scheduler 232 schedules and selects the queue Q2, whose QoS priority is the second highest, and retrieves PDU3 therein for sending. After all the output MAC PDUs in queue Q2 have been retrieved, the first scheduler 232 schedules and selects the queue Q3, whose QoS priority is the lowest, and retrieves PDU4 and PDU5 therein for sending. Thus, the final sequence for sending data is: PDU1-PDU2-PDU3-PDU4-PDU5.

Preferably, during the above procedure of scheduling and sending, once the first scheduler 232 detects that new output MAC PDUs enter the queue, for output MAC PDUs with a higher priority, the first scheduler 232 will suspend the processing to the current queue for output MAC PDU, and switch to schedule the aforesaid queue for output MAC PDU with a higher priority. The first scheduler 232 will retrieve the newly-entering output MAC PDU for sending. After completing the retrieval of all the newly-entering output MAC PDU in the queue for output MAC PDU with higher priority, the first scheduler 232 will return to schedule the queue for output MAC PDU, to which processing was suspended previously. By reference with FIG. 7, for example, when the first scheduler 232 is processing queue Q3 in the aforesaid scheduling procedure, at the moment it has retrieved PDU4 therein and is about to retrieve PDU5 therein, a new data PDU6 is entering queue Q1. Thus, the first scheduler 232 suspends the retrieval processing to queue Q3, switches to queue Q1, and retrieves the newly-entering PDU6 for sending. Thus the queue Q1 is flushed, and after that the first scheduler 232 returns to schedule the suspended queue Q3 and retrieves the left PDU5 for sending. Thus, the final sequence for sending data is: PDU1-PDU2-PDU3-PDU4-PDU6-PDU5.

The device of relaying for data relay transmission, according to the second embodiment of the invention, will be described in the following part in details by referring to FIG. 16 accompanied with FIG. 1 and FIG. 3. And FIG. 8 and the aforesaid description, of the method flow of the second embodiment of the invention, are incorporated here as reference.

In this embodiment, the functionalities of first extractor 211 and the obtaining sub-means 212 in obtaining means 21 are the same as those in the above first embodiment, and will not be described here. For example, the first extractor 211 extracts ingress CID-0x18 in the input MAC PDU header. The obtaining sub-means 212 obtains egress CID=0x3f corresponding to the ingress CID by querying the mapping table for ingress-egress CIDs, and passes the egress CID-0x3f along with the input MAC PDU to the generator 22.

The generator 2 uses the method of tunneling encapsulation, and adds a new header to the input MAC PDU for tunneling encapsulation. As shown in FIG. 9, the generator 22 embeds the egress CID=0x3f into the new header after the encapsulation, so as to generate an encapsulated output MAC PDU. In case that correction bits (including HCS for header correction and/or CRC data correction bits) is contained in the MAC PDU, it is necessary for the generator 22 to recalculate and update the correction bits of the output MAC PDU. At last, the generator 22 passes the generated output MAC PDU to the output means 23.

The functionalities of the first queuing means 231 and the first scheduler 232 in the output means 23 are the same as those in the above first embodiment, and will not be unnecessarily described here.

The device of relaying for data relay transmission, according to the third embodiment of the invention, will be described in the following part in details by referring to FIG. 16 accompanied with FIG. 1 and FIG. 3. And FIG. 10 and the aforesaid description, of the method flow of the third embodiment of the invention, are incorporated her as reference.

The subheader of the input MAC PDU comprises a group of CIDs, which includes one or more egress CIDs corresponding to one or more relay hops of the transmission path for the input MAC PDU. The first extractor 21 extracts the ingress CID information from the header of the input MAC PDU entering the RS, and extracts the group of CIDs from the subheader of the input MAC PDU. The extracted group of CIDs includes one or more egress CIDs corresponding to one or more relay hops of the transmission path for the input MAC PDU. And the first extractor 211 passes the egress CID information along with the CID group and the input MAC PDU to the obtaining sub-means 212.

The obtaining sub-means 212 extracts the CID cur responding to the present relay hop from the group of CIDs, and takes this CID as the egress CID. And the obtaining sub-means 212 passes the ingress CID, the egress CID and the input MAC PDU to the generator 22.

The generator 22 moves the ingress CID into the group of CIDs in the subheader of the input MAC PDU, and places the egress CID extracted from the group of CIDs into the header of the input MAC PDU, so as to generate the output MAC PDU. What is to be noticed is that the number of CIDs in the group of CIDs does not change.

Specifically, the aforesaid group of CIDs is taken as a CID queue, and the ingress CID is 0x18. In uplink transmission, as shown in FIG. 11a, the generator 22 moves the ingress CID=0x18 from the header of the input MAC PDU to the first position of the CID queue in the subheader of the input MAC PDU, and moves the $CID_{last}$=0x3f in the last position of the CID queue into the header of the input MAC PDU, as the new egress CID, so as to generate the output MAC PDU. In downlink transmission, as shown in FIG. 11b, the generator 22 moves the ingress CID=0x18 from the header of the input MAC PDU to the last position of the CID queue in the subheader of the input MAC PDU, and move the $CID_{first}$=0x3f in the first position of the CID queue into the header of the input MAC PDU, as the new egress CID, so as to generate the output MAC PDU. In case that correction bits (including HCS for header correction and/or CRC data correction bits) is contained in the MAC PDU, it is necessary for the generator 22 to recalculate and update the correction bits of the output MAC PDU, and this is well-known for those skilled in the art thus unnecessary description will not be given. At last, the generator 22 passes the generated output MAC PDU to the output means 23.

The functionalities of the first queuing means 231 and the first scheduler 232 in the output means 23 are the same as those in the above first embodiment, and will not be unnecessarily described here.

The device of relaying for data relay transmission, according to the fourth embodiment of the invention, will be described in the following part in details by referring to FIG. 16 accompanied with FIG. 1 and FIG. 3. And FIG. 12 and the aforesaid description, of the method flow of the fourth embodiment of the invention, are incorporated here as reference.

The subheader of the input MAC PDU comprises a group of CIDs, which includes one or more egress CIDs corresponding to one or more relay hops of the transmission path for the input MAC PDU. The first extractor 211 extracts the ingress CID information from the header of the input MAC PDC, and extracts the group or CIDs from the subheader of the input MAC PDU. The extracted group of CIDs in one or more egress CIDs corresponding to one or more relay hops of the transmission path for the input MAC PDU. The first extractor 211 passes the ingress CID, the group of CIDs and the input MAC PDU to the obtaining sub-means 212.

The obtaining sub-means 212 extracts the CID corresponding to the present relay hop from the group of CIDs, and takes this CID as the egress CID. And the obtaining sub-means 212 passes the ingress CID, the egress CID and the input MAC PDU to the generator 22.

The generator 22 replaces the ingress CID, in the header of the input MAC PDU, by the egress CID, so as to generate the output MAC PDU. What is to be noticed is that the number of CIDs in the group of CIDs decreases by one. Specifically, as shown in FIG. 13, for example, the group of CIDs is taken as a stack, and the ingress CID=0x18, the generator 22 takes the first CID=0x3f on the top of the CID stack out as the egress CID, and uses it to replace the ingress CID=0x18 in the header of the input MAC PDU, so as to generate the output MAC PDU. Incase that correction bits (including HCS for header correction and/or CRC data correction bits) is contained in the MAC PDU, it is necessary for the generator 22 to recalculate and update the correction bits of the output MAC PDU. The generator 22 passes the output MAC PDU to the output means 23.

The functionalities of the first queuing means 231 and the first scheduler 232 in the output means 23 are the same as these in the above first embodiment, and will not be unnecessarily described here.

The device of relaying for data relay transmission, according to the fifth embodiment of the invention, will be described in the following part in details by referring to FIG. 16 accompanied with FIG. 1 and FIG. 3. And FIG. 14 and the aforesaid description, of the method flow of the fifth embodiment of the invention, are incorporated here as reference.

The input MAC PDU includes one or more encapsulation headers, each of which includes the egress CID corresponding to one or more relay hops of the transmission path for the input MAC PDU. The first extractor 11 extracts the ingress CID information from the header of the input MAC PDU entering the RS, and passes the ingress CID information along with the input MAC PDU to the obtaining sub-means 212.

As shown in FIG. 15, the obtaining sub-means 212 decapsulates the input MAC PDU, and removes the header H1 therein which contains the ingress CID, thus the header H2 encapsulated therein becomes the new header of the MAC PDU, and the CID contained in the header H2 becomes the egress CID. The obtaining sub-means 212 passes the egress CID and the decapsulated MAC PDU to the generator 22.

The generator 22 takes the decapsulated MAC PDU, namely the MAC PDU with the removal of header H1, as the output MAC PDU. In case that correction bits (including HCS for header correction and/or CRC data correction bits) is contained in the MAC PDU, it is necessary for the generator 22 to recalculate and update the correction bits of the output MAC PDU. The generator 22 passes the output MAC PDU to the output means 23.

The functionalities of the first queuing means 231 and the first scheduler 232 in the output means 23 are the same as these in the above first embodiment, and will not be unnecessarily (described here.

Figure 17:
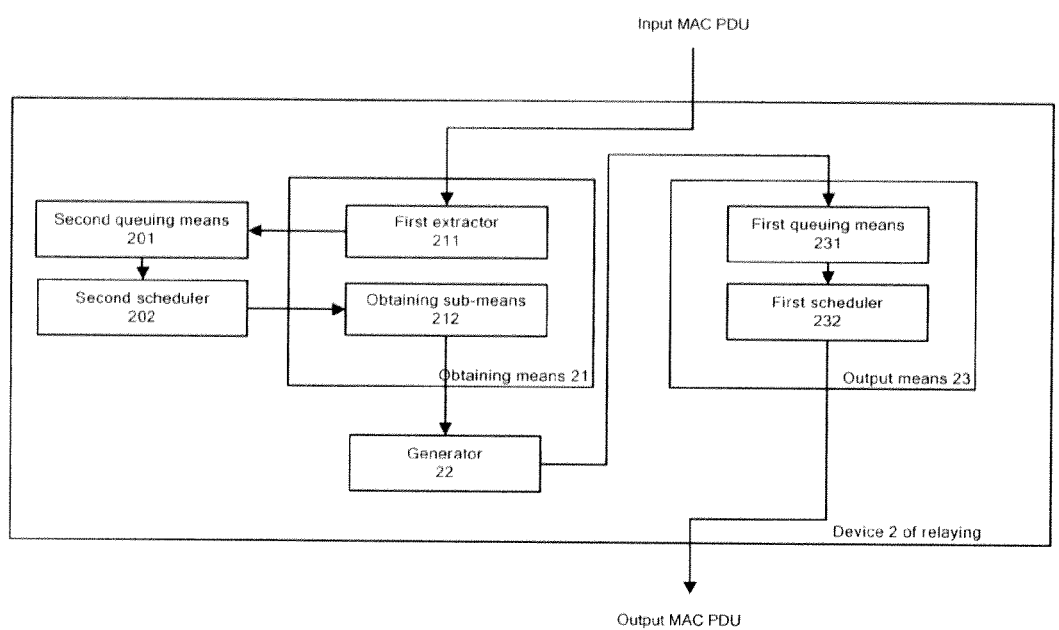
FIG. 17 is a block diagram of another device for data relay transmission, in wireless relay communication networks, according to the invention.

FIG. 17 is a block diagram of a preferable embodiment of the device of relaying for data relay transmission. With respect to the block diagram shown in FIG. 16, the device of relaying shown in FIG. 17 further comprises: a second queuing means 201 and a second scheduler 202. The means in the device of relaying in FIG. 17 and that in the device of relaying in FIG. 16, with the same numeral, have the same functionality, and won't be described unnecessarily.

Specifically, after the first extractor 211 extracts the ingress CID in the header of the input MAC PDU, it passes the input MAC PDU and the ingress CID to the second queuing means 201 instead of to the obtaining sub-means 212 directly. The second queuing means 201 places the input MAC PDUs into queues for input PDUs providing a corresponding QoS, according to the ingress CID extracted. Thus the input MAC PDU is queued. For this sake, the relay station offers several queues for input MAC PDUs providing different types for QoS service.

The second scheduler 202 retrieve the input MAC PDUs in the queues for input MAC PDUs by the sequence of QoS from high to low, according to a second predefined rule. The second scheduler 202 first selects the queue for input MAC PDUs with high QoS priory and retrieves the input MAC PDUs therein. After the queue for input MAC PDUs with high QoS priority has been flushed, the second scheduler 202 switches to schedule the queue for input MAC PDUs with second high QoS priority and retrieves the input MAC PDUs therein. The process proceeds the same manner until the queue for input MAC PDU with the lowest priority is processed. The methodology is the same as the processing to the output MAC PDU carried through by the device 2 of relaying, and unnecessary description won't be, given. After the second scheduler 202 retrieves the input MAC PDUs, it then passes the input MAC PDU to the obtaining sub-means 212.

Hereinbefore, the MAC layer is taken as an example to describe the method and device for data relay transmission. Those skilled in the art should understand that: the invention is also applicable to other layers in the network protocols, such as the networking layer or transporting layer in the OSI protocol, or the IP layer or network accessing layer in the TCP/IP protocol. Unnecessary description won't be given.

Although the preferable embodiments of the present invention have been described above, the protection scope of the invention is not limited by them. Easy modifications can be made by those skilled in the art without departing from the scope and spirit of the present invention, and all these modifications should be deemed as within the protection scope of the invention. Thus, the protection scope of the invention shall be determined by the protection scope of the claims.

What is claimed is:

1. A method of relaying, in relay stations of a wireless relay communication network, for data relay transmission, the method comprising:
    obtaining egress connection identifier (CID) related information corresponding to input protocol data units (PDUs), according to the input PDUs;
    generating output PDUs, including the egress CID related information, based on the input PDUs; and
    performing quality of service (QoS) scheduling for the output PDUs according to the egress CID related information, wherein performing the QoS scheduling is based on a first predefined rule, so as to output the output PDUs in the sequence of QoS, the performing comprising:
        placing the output PDUs into queues for output PDUs providing the corresponding QoS according to the egress CID related information; and
        selecting corresponding queues for output PDUs according to the sequence of QoS, based on a first predefined rule and retrieving the output PDUs contained therein for outputting.

2. The method according to claim 1, further comprising:
    extracting ingress CID related information from the input PDUs; and
    obtaining the egress CID related information according to the ingress CID related information.

3. The method according to claim 2, further comprising:
    finding the corresponding egress CID in a pre-stored mapping table for ingress-egress CIDs, according to the ingress CID, wherein the ingress CID related information comprises the ingress CID of the input PDU; or,
    extracting the egress CID related information corresponding to the present relay hop, from the group of CIDs of the input PDUs, wherein the ingress CID related information comprises a group of CIDs which includes one or more egress CIDs corresponding to one or more relay hops of the transmission path for the input PDUs.

4. The method according to claim 2, further comprising:
    replacing the ingress CID in the header of the input PDUs, by the egress CID, in order to generate the output PDUs; or,
    performing tunneling encapsulation for the input PDUs in order to generate the output PDUs, wherein the egress CID is placed in the encapsulation header of the output PDUs.

5. The method according to claim 2, wherein the input PDUs include one or more encapsulation headers, each of which includes the egress CID information corresponding to one or more relay hops of the transmission path for the input PDUs, the method further comprising:
    decapsulating the input PDUs in order to obtain decapsulated PDUs;
    extracting the egress CID related information corresponding to the present relay hop, from the header of the decapsulated PDUs; and
    taking the decapsulated PDUs as the output PDUs.

6. The method according to claim 2, further comprising:
    placing the input PDUs into queues for input PDUs providing a corresponding QoS, according to the ingress CID related information; and
    selecting corresponding queues for input PDUs according to the sequence of QoS, based on a second predefined rule, and retrieving the input PDUs contained therein.

7. A device of relaying, in a wireless relay communication network, for data relay transmission, the device comprising:
    an obtaining processor, configured to obtain egress connection identifier (CID) related information corresponding to input protocol data units (PDUs), according to the input PDUs;
    a generator, configured to generate output PDUs including the egress CID related information, based on the input PDUs;
    an output processor, configured to perform quality of service (QoS) scheduling for the output PDUs according to the egress CID related information, wherein the QoS scheduling is based on a first predefined rule, so as to output the output PDUs in the sequence of QoS, the output processor comprising:
        a first queuing subprocessor configured to place the output PDUs into queues for output PDUs providing the corresponding QoS according to the egress CID related information; and
        a first scheduler subprocessor configured to select corresponding queues for output PDUs according to the sequence of QoS based on a first predefined rule and configured to retrieve the output PDUs contained therein for outputting.

8. The device according to claim 7, the obtaining processor comprising:
    a first extractor subprocessor, configured to extract ingress CID related information from the input PDUs; and
    an obtaining subprocessor, configured to obtain the egress CID related information according to the ingress CID related information.

9. The device according to claim 8, wherein the ingress CID related information comprises the ingress CID of the input PDU, wherein the obtaining subprocessor is configured to find the corresponding egress CID in a pre-stored mapping table for ingress-egress CIDs, according to the ingress CID; or,
    wherein the ingress CID related information comprises a group of CIDs, which includes one or more egress CIDs corresponding to one or more relay hops of the transmission path for the input PDUs, wherein the obtaining subprocessor is configured to extract the egress CID related information corresponding to the present relay hop, from the group of CIDs of the input PDUs.

10. The device according to claim 8, wherein said generator is configured to replace the ingress CID in the header of the input PDUs, by the egress CID, in order to generate the output PDUs; or,
    wherein the generator is configured to perform tunneling encapsulation for the input PDUs in order to generate the output PDUs, wherein the egress CID is placed in the encapsulation header of the output PDUs.

11. The device according to claim 8, wherein the input PDUs include one or more encapsulation headers, each of which includes the egress CID information corresponding to one or more relay hops of the transmission path for the input PDUs, wherein the obtaining subprocessor is further configured to decapsulate the input PDUs in order to obtain decapsulated PDUs, and configured to extract the egress CID related information corresponding to the present relay hop, from the header of the decapsulated PDUs;
    wherein the generator is further configured to take the decapsulated PDUs as the output PDUs.

12. The device according to claim 8, the device further comprising:
    an input means, comprising:
        a second queuing subprocessor, configured to place the input PDUs into queues for input PDUs providing a corresponding QoS, according to the ingress CID related information; and
        a second scheduler subprocessor, configured to select corresponding queues for input PDUs according to the sequence of QoS, based on a second predefined rule, wherein the second scheduler subprocessor is also configured to retrieve the input PDUs contained therein.

13. A method of relaying, in relay stations of a wireless relay communication network, for data relay transmission, the method comprising:
    obtaining egress connection identifier (CID) related information corresponding to input protocol data units (PDUs) according to the input PDUs;
    extracting ingress CID related information from the input PDUs;
    placing the input PDUs into queues for input PDUs providing a corresponding quality of service (QoS) according to the ingress CID related information;
    selecting corresponding queues for input PDUs according to the sequence of QoS, based on a second predefined rule, and retrieving the input PDUs contained therein;
    obtaining the egress CID related information according to the ingress CID related information;
    generating output PDUs, including the egress CID related information, based on the input PDUs; and
    performing QoS scheduling for the output PDUs according to the egress CID related information, wherein performing the QoS scheduling is based on a first predefined rule so as to output the output PDUs in the sequence of QoS.

14. The method according to claim 13, further comprising:
    finding the corresponding egress CID in a pre-stored mapping table for ingress-egress CIDs, according to the ingress CID, wherein the ingress CID related information comprises the ingress CID of the input PDU; or
    extracting the egress CID related information corresponding to a present relay hop from a group of CIDs of the input PDUs, wherein the ingress CID related information comprises the group of CIDs which includes one or more egress CIDs corresponding to one or more relay hops of the transmission path for the input PDUs.

15. The method according to claim 13, further comprising:
    replacing the ingress CID in the header of the input PDUs, by the egress CID, in order to generate the output PDUs; or
    performing tunneling encapsulation for the input PDUs in order to generate the output PDUs, wherein the egress CID is placed in the encapsulation header of the output PDUs.

16. The method according to claim 13 wherein the input PDUs include one or more encapsulation headers, each of which includes the egress CID information corresponding to one or more relay hops of the transmission path for the input PDUs, the method further comprising:
    decapsulating the input PDUs in order to obtain decapsulated PDUs;
    extracting the egress CID related information corresponding to the present relay hop from the header of the decapsulated PDUs; and
    taking the decapsulated PDUs as the output PDUs.

17. The method according to claim 13, further comprising:
    placing the output PDUs into queues for output PDUs providing the corresponding QoS according to the egress CID related information; and
    selecting corresponding queues for output PDUs according to the sequence of QoS based on a first predefined rule and retrieving the output PDUs contained therein for outputting.

18. A device for relay in a wireless relay communication network for data relay transmission, the device comprising:
    an obtaining processor configured to obtain egress connection identifier (CID) related information corresponding to input protocol data units (PDUs) according to the input PDUs;
    a generator configured to generate output PDUs, including the egress CID related information, based on the input PDUs; and
    an output processor configured to perform quality of service (QoS) scheduling for the output PDUs according to the egress CID related information, wherein the QoS scheduling is based on a first predefined rule so as to output the output PDUs in the sequence of QoS;
    wherein the obtaining processor comprises:
        a first extractor subprocessor configured to extract ingress CID related information from the input PDUs; and
        an obtaining subprocessor configured to obtain the egress CID related information according to the ingress CID related information;
    the device further comprising:
    an input processor, comprising:
        a second queuing subprocessor configured to place the input PDUs into queues for input PDUs providing a corresponding QoS according to the ingress CID related information; and
        a second scheduler subprocessor configured to select corresponding queues for input PDUs according to the sequence of QoS based on a second predefined rule, wherein the second scheduler subprocessor is also configured to retrieve the input PDUs contained therein.

19. The device according to claim 18 wherein the ingress CID related information comprises the ingress CID of the input PDU, wherein the obtaining subprocessor is configured to find the corresponding egress CID in a pre-stored mapping table for ingress-egress CIDs according to the ingress CID; or wherein the ingress CID related information comprises a group of CIDs which include one or more egress CIDs corresponding to one or more relay hops of the transmission path for the input PDUs, wherein the obtaining subprocessor is configured to extract the egress CID related information corresponding to the present relay hop from the group of CIDs of the input PDUs.

20. The device according to claim 18 wherein the generator is configured to replace the ingress CID in the header of the input PDUs, by the egress CID, in order to generate the output PDUs; or, wherein the generator is configured to perform tunneling encapsulation for the input PDUs in order to generate the output PDUs, wherein the egress CID is placed in the encapsulation header of the output PDUs.

21. The device according to claim 18 wherein the input PDUs include one or more encapsulation headers, each of which includes the egress CID information corresponding to one or more relay hops of the transmission path for the input PDUs, wherein the obtaining subprocessor is further configured to decapsulate the input PDUs in order to obtain decapsulated PDUs and configured to extract the egress CID related information corresponding to the present relay hop from the header of the decapsulated PDUs;

wherein the generator is further configured to take the decapsulated PDUs as the output PDUs.

22. The device according to claim 18, the output processor comprising:

a first queuing subprocessor configured to place the output PDUs into queues for output PDUs providing the corresponding QoS according to the egress CID related information; and a first scheduler subprocessor configured to select corresponding queues for output PDUs according to the sequence of QoS based on a first predefined rule and configured to retrieve the output PDUs contained therein for outputting.

* * * * *